United States Patent [19]

Erin

[11] 4,326,204

[45] Apr. 20, 1982

[54] DENSITY CONTROL SYSTEM FOR JET DROP APPLICATOR

[75] Inventor: Tim Erin, Beavercreek, Ohio

[73] Assignee: The Mead Corporation, Dayton, Ohio

[21] Appl. No.: 180,555

[22] Filed: Aug. 25, 1980

[51] Int. Cl.$^3$ .......... G01D 15/18

[52] U.S. Cl. .......... 346/75

[58] Field of Search .......... 346/1.1, 75, 140; 118/624, 697

[56] References Cited

U.S. PATENT DOCUMENTS

| | | | |
|---|---|---|---|
| 3,373,437 | 3/1968 | Sweet et al. | 346/75 |
| 3,588,906 | 6/1971 | Van Brimer et al. | 346/1.1 |
| 3,701,476 | 10/1972 | Houser | 239/102 |
| 3,717,722 | 2/1973 | Messner | 118/624 X |
| 3,803,628 | 4/1974 | Van Brimer et al. | 346/75 X |
| 3,913,719 | 10/1975 | Frey | 346/75 X |
| 3,915,113 | 10/1975 | Paton et al. | 118/697 |
| 4,006,482 | 2/1977 | Heath et al. | 346/75 |
| 4,087,825 | 5/1978 | Chen et al. | 346/75 |

OTHER PUBLICATIONS

Journal of Applied Photographic Engineering, vol. 6, No. 3, Jun. 1980, pp. 78-82.

An Application of Ink Jet to the X-Y Plotter, M. Mutoh et al., 346-375.

*Primary Examiner*—Donald A. Griffin

*Attorney, Agent, or Firm*—Biebel, French & Nauman

[57] ABSTRACT

The control of the drop charging potential on a charging electrode of jet drop coating apparatus is synchronized with both the frequency of the stimulation signal and the substrate movement to provide an improved control of the density of coating.

5 Claims, 9 Drawing Figures

FIG-4
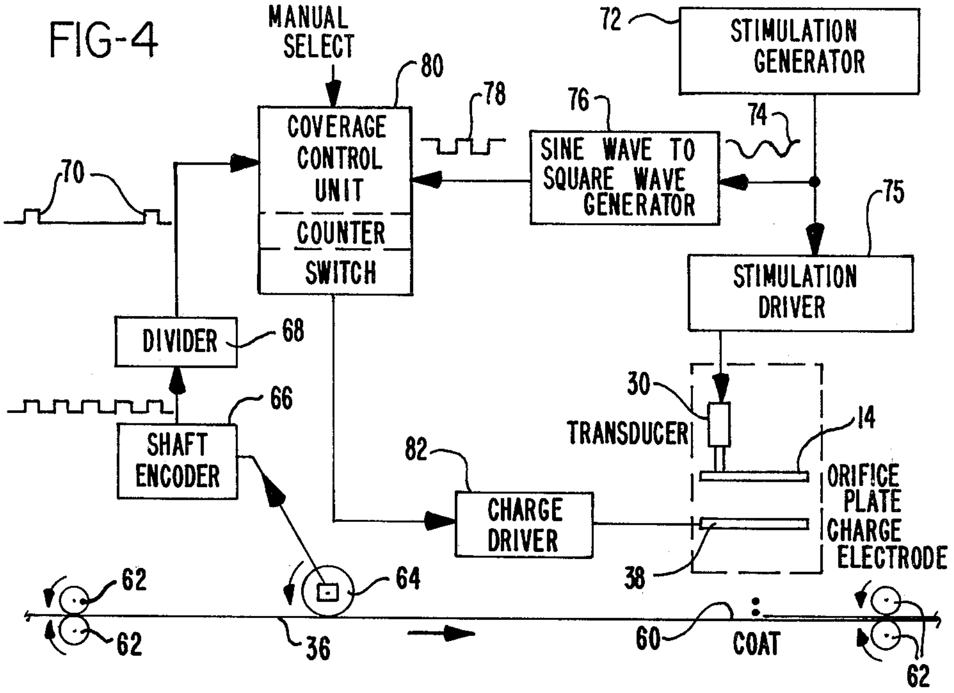
FIG-5a
FIG-5b
FIG-5c
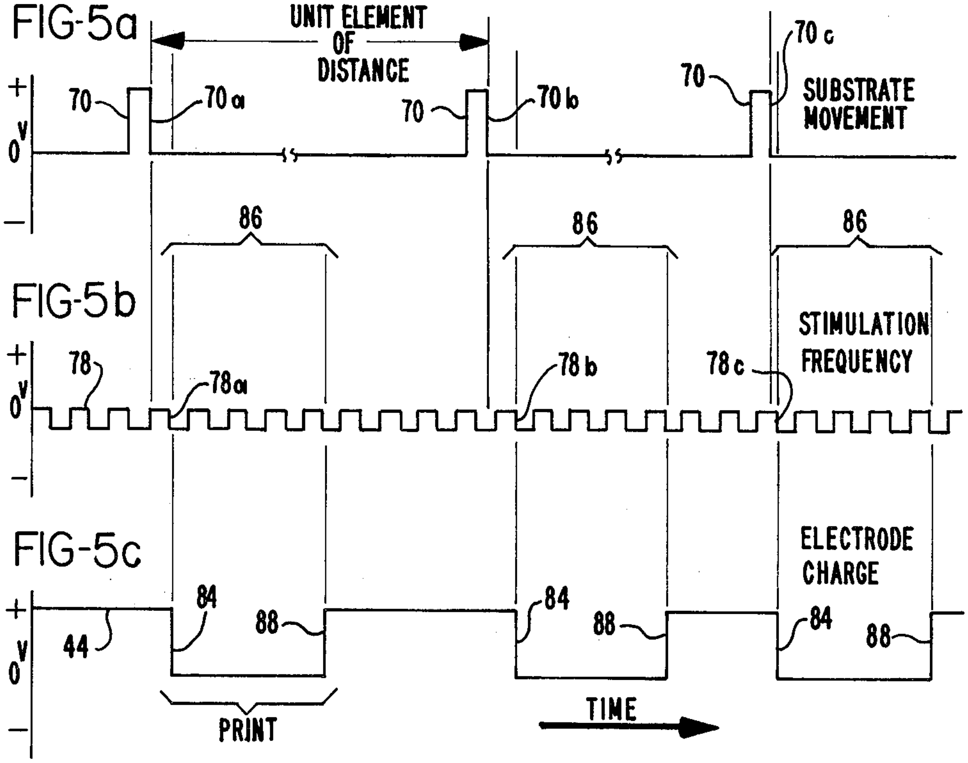

FROM STIM. GENERATOR
STIMULATION CLOCK TO CHARGE DRIVER
COAT CONTROL TO CHARGE DRIVER
4528
4024
4043
4518
4063
BCD SWITCH 0-9
BCD SWITCH 10-90
BCD SWITCH 100-900
+5
1K
10K
4.7K
180K
5K
.001

DENSITY CONTROL SYSTEM FOR JET DROP APPLICATOR

BACKGROUND OF THE INVENTION

This invention relates to jet drop printers and applicators, and more particularly to the precise control of the density of the fluid application by controlling the time interval that charge potential is applied to the charge electrode. Jet drop printers are well known. Typical examples of the prior art of interest in connection with this invention may be found in U.S. Pat. Nos. 4,087,825 to patentees Chen et al; 3,787,881 to patentee Duffield; 3,588,906 to patentees VanBrimer et al; 3,803,628 to patentees Van Brimer et al; 4,033,154 to patentee Johnson; 3,915,113 to patentees Paton et al; 3,373,437 to patentees Sweet et al; 3,739,393 to patentees Lyon et al; 3,882,508 to patentee Stoneburner; and 4,095,232 to patentee Cha. The control of the density of an applied coating has been a serious problem. Generally, in the prior art, the density of fluid application has been controlled by turning on the drop stream for an arbitrary period of time. More sophisticated systems have used a tachometer measuring substrate travel by which to vary, that is, lengthen or shorten the set period of time in accord with the substrate movement. An example of this is illustrated by U.S. Pat. No. 3,803,628. Generally, the best control over the density of coating possible with prior art devices has only been to within quite a few drops per dot.

SUMMARY OF THE INVENTION

The invention provides an electronic control system for controlling the potential on the charging electrode of jet drop printers and applicators such that the density of the coating is controlled to substantially within ± one drop per dot. This accuracy of density control is achieved by synchronizing the turn-on and turn-off of the charging potential not only with the substrate movement but also with the drop stimulation frequency. It is therefore an object of the invention to provide a density control system in which the duration of the charge potential, for printing, on the charge electrode is equal to the drop formation time for a predetermined number of drops. It is another object of the invention to provide a density control system in which the number of drops per dot is substantially independent of the velocity of substrate travel. It is another object of the invention to provide a density control system in which the printing time is an integer number of periods of the stimulation signal and the repetition of printing time is directly related to the movement of the substrate. It is yet another object of the invention to provide a density control system for jet drop applicators in which the desired coating density is manually set directly in drops per dot.

BRIEF DESCRIPTION OF THE DRAWING

FIG. 4 is a simplified block diagram of an embodiment of the invention;

FIG. 5*a* is a potential curve illustrating pulses indicating unit distances of movement of the substrate;

FIG. 5*b* is a potential curve illustrating a generated square wave at the stimulation frequency;

FIG. 5*c* is a potential curve illustrating the charge potential on the charging electrode;

DETAILED DESCRIPTION OF THE PREFERRED EMBODIMENT

Figure 1:
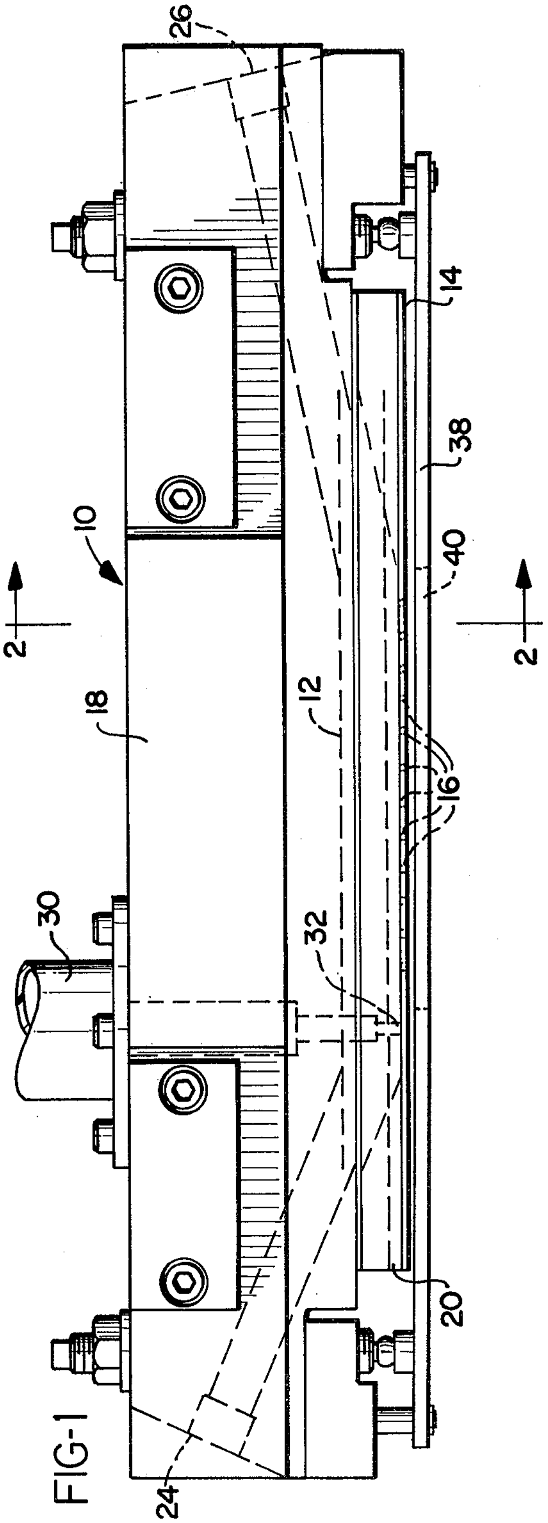
FIG. 1 illustrates a front elevation view of a typical coating head.
Figure 3:
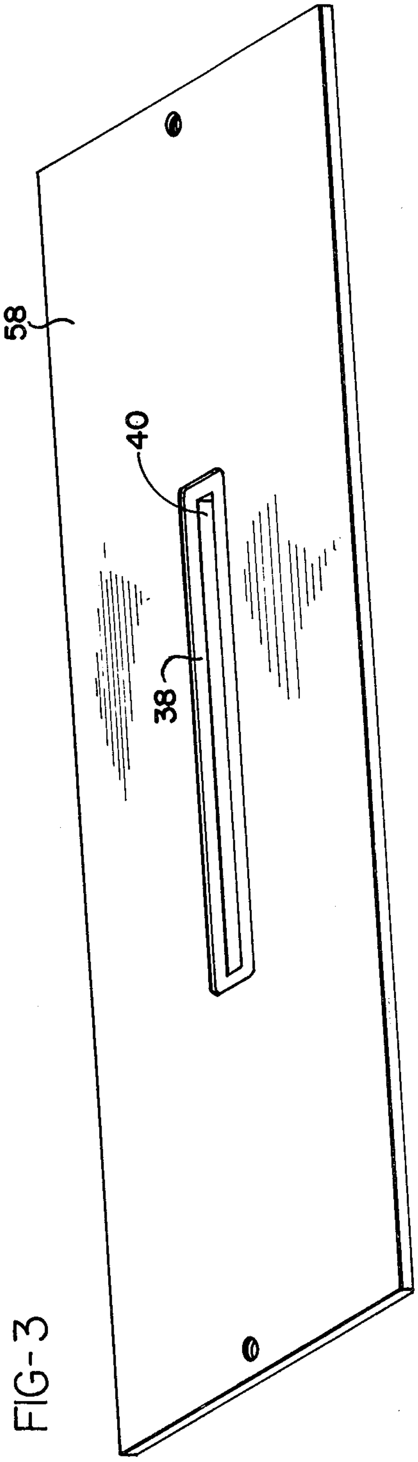
FIG. 3 illustrates in perspective a suitable charging plate for the coating head shown in FIGS. 1 and 2.
Figure 2:
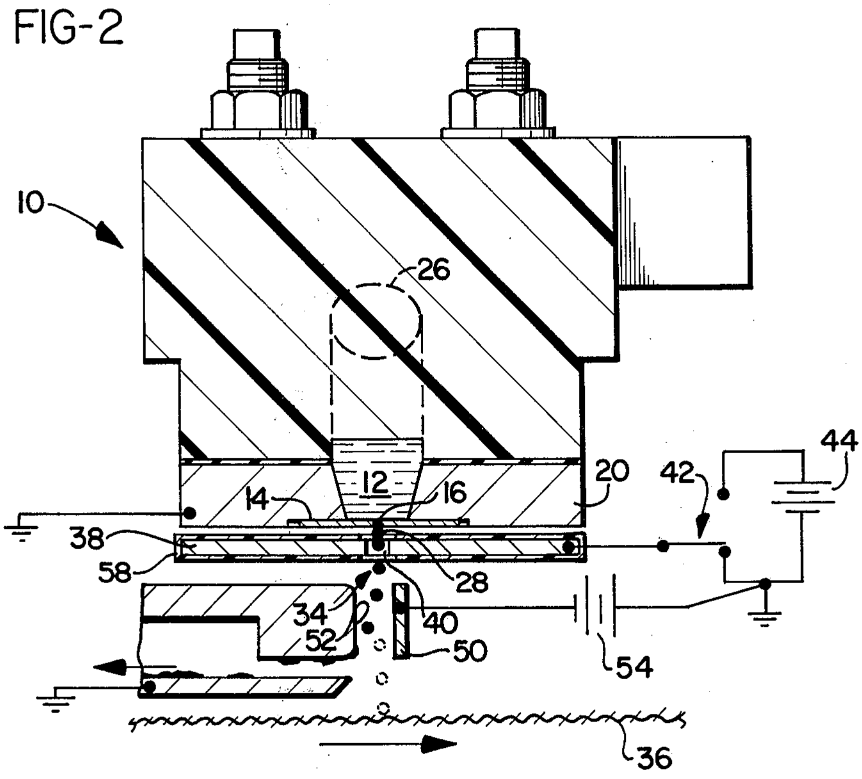
FIG. 2 illustrates a sectional view taken along line 2—2 of FIG. 1 along with a simplified electronic control circuit for drop deposition on a substrate.

The mechanical structure of a typical jet drop fluid coating device is shown in FIGS. 1, 2, and 3. The present invention relates to an electronic control system for controlling the density, that is, number of drops per dot of the coating. The coating head 10 contains a fluid receiving reservoir 12 having orifice plate 14 defining a plurality of orifices 16 communicating with the reservoir 12. Reservoir 12 has fluid inlet opening 24, communicating with a source of coating fluid, and fluid outlet opening 26. Conventional valving and fluid pressure control means provide that the fluid is supplied under pressure to the reservoir 12 such that the fluid flow through each of the orifices 16 emerges therefrom as a fluid filament 28. Orifice plate 14 is formed from a flexible material such as berrylium copper. It is stimulated by tip 32 of transducer 30 such that a series of bending waves travel along the orifice plate 14 flexing it upward and downward with each point along the orifice plate repetitively flexed upward and downward. This stimulating of the orifice plate 14 causes the fluid filaments 28 to break up into jet drop streams 34. This action is further described in U.S. Pat. Nos. 3,739,393 and 3,882,508. Each of the jet drop streams from orifices 16, one of which 34 is illustrated in FIG. 2, is directed generally toward a fluid receiving medium 36 such as a moving web of fabric material.

A drop charging plate or electrode 38 fabricated of electrically conductive material charges the drops formed from the fluid filaments 28. The charging plate 38 shown in detail in FIG. 3 is covered with an insulating material 58 except for the region generally defining a charge slot 40. The gang charging of a plurality of jet streams is further described in U.S. Pat. No. 3,787,881. The charging plate 38 is mounted adjacent and aligned with the remainder of the coating head 10 such that the fluid filaments 28 extend into the charging slot 40 of the charging plate 38 and the break-up of each of the filaments into drops occurs within the slot. The control of potential on the charging electrode is shown in simplified form in FIG. 2 and will be explained in simplified form first so that the complex details of the invention as will be set forth later may be easier and better understood at that time.

The arm of switch 42 is electrically connected to the charging plate 38. When switch 42 is in its lower position, as illustrated, the switch applies a first electrical potential equal to the electrical potential on the fluid reservoir 12 to the charging plate 38. When the switch 42 is in its upper position, the switch applies a second electrical potential represented by battery 44 to the charging plate 38. This places a potential charge on plate 38 with respect to the fluid in the reservoir 12, formed by container 20, which remains at ground potential. When the switch 42 is in its lower position, both the fluid in the reservoir and the charging plate 38 are at the same electrical potential and the drops 34 which are formed at the tip of the filaments 28 break off carrying no electrical charge. When the charge plate 38 is at the illustrated potential 44 due to switch 42 being in the upper position, a drop at break-off takes on a negative charge. When a negative charged drop enters the influence of deflecting electrode 50, which is also negatively charged by potential 54, the drop is deflected away from electrode 50 so as the impact on drop catching surface 52. It is thus inhibited from ever reaching substrate 36. When a drop is uncharged, it is not deflected by the field from the deflecting electrode 50, thus it progresses on to strike the moving substrate material 36.

The foregoing description applies generally to jet drop coating and printing apparatus. It may be seen that the polarity of the potentials is relative and the deflection of the drop with respect to-print, or not-print, may be reversed. It is readily recognized in a typical application of jet drop coating apparatus that the switch controlling the charge on the charging electrode is oversimplified as represented schematically by the simple single-pole double throw switch 42. It is also recognized that the density of the coating on substrate 36 is in addition to other things a function of the number of drops impacting in substantially the same spot to form a dot on the substrate. Thus, if the substrate is considered made up of a series of overlapping unit areas having a unit length as measured by a distance in the direction of the travel of the substrate, and a certain number of drops are deposited in each unit area as the substrate moves through the coating region, the coating of the substrate will be uniform. (Other factors such as drop size and the uniformity of characteristics of the substrate being considered constant). As previously mentioned, the prior art devices in controlling the coating have generally periodically turned on the coating, that is, removed the charge from the charging electrode, in coating embodiments such as being described, for a fixed period of time each period as the substrate is moved through the coating region. Some prior art devices have varied the time period in accord with the velocity of travel of the substrate. None of the known prior art devices directly meet the requirement for uniform density generally set forth as being a certain number of drops per unit area, and thus the control of the density of the coating has been considerably less than desired.

The present invention as illustrated in simplified block schematic form in FIG. 4 substantially meets the foregoing requirement for uniform density. As the substrate 36 is moved through the coating region 60, by drive rollers 62, tachometer wheel 64, monitors the movement of the substrate and with the cooperation of shaft encoder 66, and divider 68, a pulse 70 is provided each time the substrate moves a unit distance. The conventional stimulation generator 72 generates a stimulation frequency signal 74 compatible with the orifice plate and other parameters as taught by the prior art. Conventional stimulation driver 75 amplifies the stimulation signal from the stimulation generator and drives conventional transducer 30 which stimulates the orifice plate 14. The sine wave to square wave generator 76 changes the sine wave stimulation signal 74 to a square wave signal 78 of the same frequency. The coverage control unit 80 contains a counter for counting a determined number of cycles of the square wave 78 as manually selected. The coverage control unit 80 sends a switching signal to the charge driver 82 which removes the charge from the charge electrode for the selected number of stimulation cycles for each unit of distance moved by the substrate.

The foregoing operations are diagrammed in their relative position in FIGS. 5*a,* 5*b,* and 5*c.* FIG. 5*a* depicts the pulses 70 which occur as the substrate moves through a unit amount of distance. Note that the occurrence of the pulse is not on a time scale but indicates a movement of the substrate through a distance. In a typical embodiment of the invention, the unit element of distance for proper coverage considering the substrate material, and other factors, was determined to be approximately 0.020 inch. The shaft encoder 66 of the tachometer wheel 64 produce pulses every 0.005 inch of travel of the substrate. Thus divider 68 divided the pulse train coming from the encoder by four to provide a pulse 70 for each 0.020 inch of substrate movement. The trailing edge, that is downgoing voltage of these unit distance pulses enables, that is, readies the counter to start counting square waves of the stimulating signal at the next downgoing segment of the square wave.

Referring to FIGS. 5*a* and 5*b,* the downgoing voltage 70*a* turns the counter on to start counting at the next downgoing segment 78*a* of stimulation square wave 78. At the same time that the counter starts counting, the charging voltage 44 is removed 84 from the charging electrode and the following drop strikes the substrate. The apparatus continues to coat the substrate until the charging voltage is again placed on the charging electrode. In the embodiment being described and illustrated, the manual select dials of the coverage control unit were set from 4 drops per unit area. Thus, the counter counts four cycles 86 of the square wave of the stimulation frequency and switches on the charge driver. This is representative of the voltage rise 88 in the curve of FIG. 5*c,* the electrode charging voltage.

FIGS. 5*a,* 5*b,* and 5*c* also illustrate that the time intervals between the signals 70*a,* 70*b,* and 70*c* turning on the counter and the counter starting to count at the next downgoing square wave segment 78*a,* 78*b,* and 78*c* may vary up to approaching 1 square wave cycle, but that the on-time 86 for printing or coating is always the same for a given setting of the number of drops set in the manual select control. Since the number of drops is directly related to the stimulation frequency, i.e., a drop is formed each cycle, an equal number of drops per unit element of distance would always be deposited except for the instance where a drop is just leaving a jet as the charging electrode voltage is being switched. Since the orifice plate in the embodiment being described and illustrated is stimulated by a surface accoustic wave along its surface, there does exist a difference in the phase relationships between the formation of drops in the plurality of jets. At the present state of the art it is not feasible to completely correct for this phase difference when using traveling wave stimulation. With plane wave stimulation as illustrated by U.S. Pat. No. 4,095,232 to patentee Cha and with simultaneous break-off of all the drops, it may be feasible to make a single phase adjustment of the square wave frequency 78 with respect to the sine wave stimulation frequency 74 that will preclude splitting drops, (that is, prevent a change of the voltage on the charge electrode taking place simultaneously with drop break-off). In the embodiment being described in detail, the probability of splitting a drop is substantially eliminated by making the rise time 88 and the fall time 84 of the voltage of the charging electrode very steep. Thus, the simultaneous occurrence of a voltage switch at the instance of break-off is quite remote and substantially uniform coating of the selected number of drops per dot is obtained.

Figure 6:
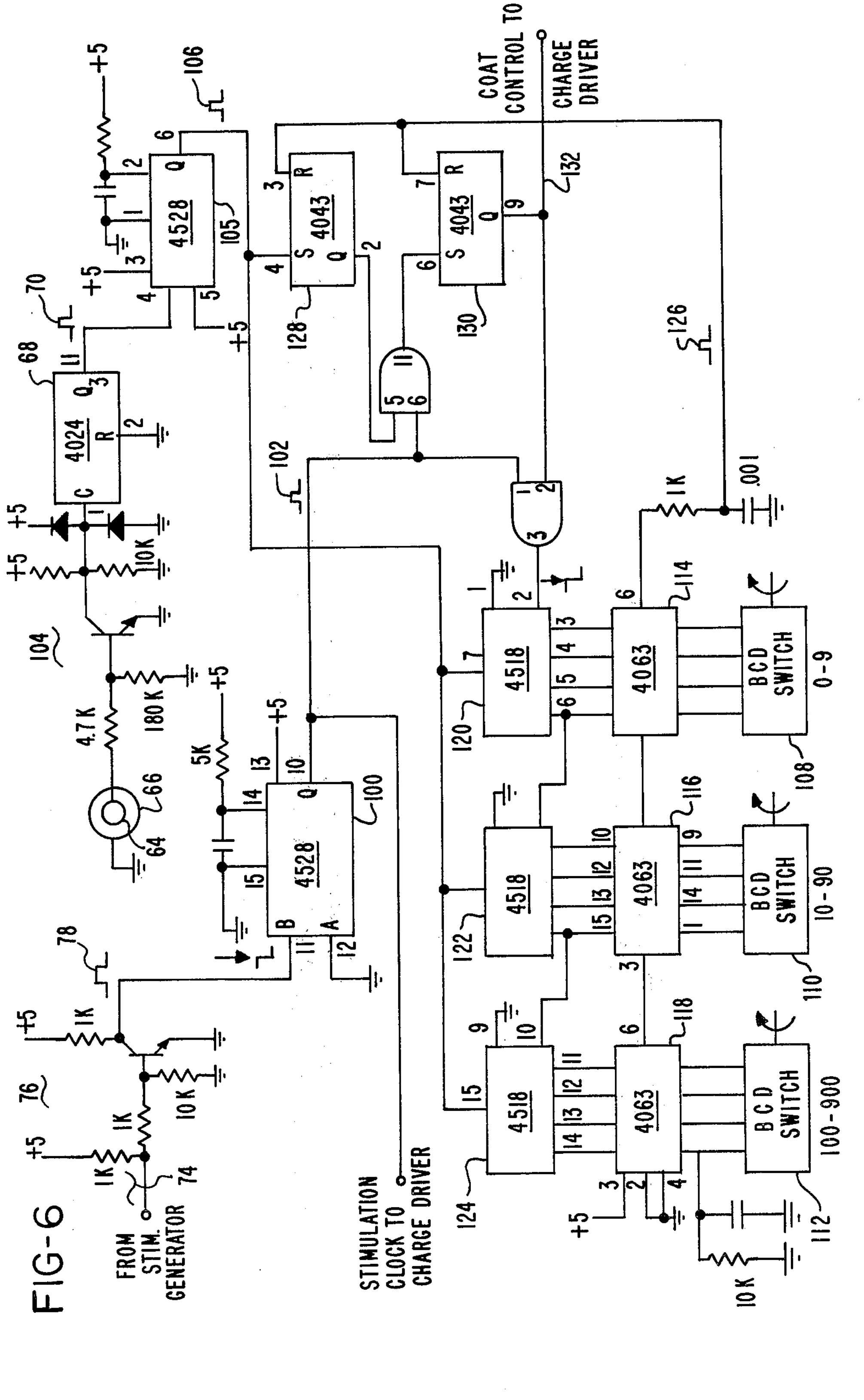
FIG. 6 schematically illustrates an embodiment of a drops per dot coverage control unit and tachometer divider network.
Figure 7:
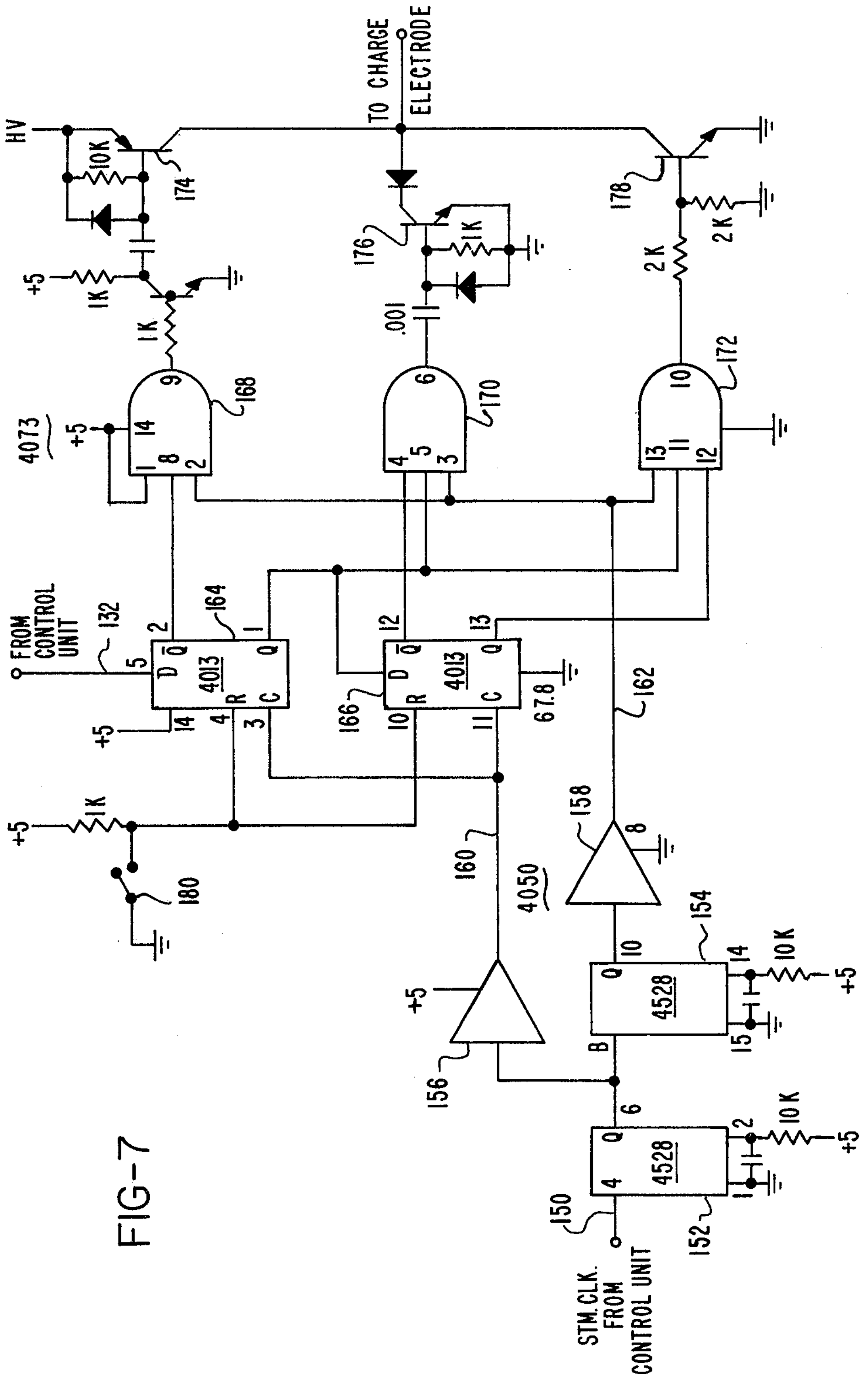
FIG. 7 schematically illustrates an embodiment of a charge driver for placing and removing charge on the charging electrode.

To further aid the practicing of the invention, detailed circuits of suitable typical embodiments of a coverage control unit and a charge driver are shown respectively in FIGS. 6 and 7. Referring to FIG. 6, the sine wave stimulation signal 74 is changed to a square wave signal 78 by square wave generator 76. Monostable multivibrator 100 triggers on the trailing edge (downgoing voltage) of the square wave and provides a timing pulse 102. (½ of a CMOS 4528 as illustrated is suitable). The tachometer signal from the tachometer encoder 66 is buffered in amplifier 104 and divided down in the 7 stage binary ripple counter 68 (typically a CMOS 4204) to provide an output pulse 70 representative of a unit distance of movement of the substrate. Note output pin 11 provides a divide by 4. Other pins provide different ratios which may be utilized for embodiments for different characteristics. Monostable multivibrator 105 triggers on the trailing edge of this pulse and provides a timing pulse 106. The manual select drops per dot 3-decade counter has manually selectable binary coded decimal switches 108, 110, and 112. These switches coöperate with the 4-bit magnitude converters 114, 116, and 118 and the binary coded decimal upcounters 120, 122, and 124 to provide a signal 126 at the termination of the selected number of counts. Quad NOR R-S latch circuits 128 and 130 provide a set-reset switch that provides a timing signal on line 132 to the charge driver for charging or removing charge from the charging electrode.

As previously described, it is highly desirable to effect the switching of the potential of the charge electrode in a short interval of time to substantially preclude the splitting of a charge on a drop. An example of an embodiment of a typical charge driver providing relatively steep rise and fall times is illustrated in FIG. 7. The stimulation clock signal on line 150 is derived from the stimulation square wave triggered multivibrator 100 (FIG. 6). The clock sequencer circuit, comprising monostable multivibrators 152 and 154, and buffer amplifiers 156 and 158 (typical sections of a hexbuffer 4050), provides typically a one microsecond load data pulse on line 160 and a one microsecond strobe pulse, with the leading edge of the strobe pulse coinciding with the trailing edge of the load pulse, on line 162. The electrode charge control signal on line line 132 from the coverage control unit actuates the dual type D flip-flops 164 and 166 which through the three input AND gates 168, 170, and 172 (typically a type 4073 triple 3-input AND gate) drive transistors 174, 176, and 178, respectively. Transistor 174 functions in a pull-to-catch circuit. That is, it provides a fast raise time to the application of the charging potential to the charging electrode. Transistor 178 functions in a pull-to-ground circuit. That is, it provides a fast fall time to the removal of the charge to the charging electrode. Transistor 176 speeds up the switching by tending to balance charge ring capacity effects and to pull to an intermediate level frequently termed the J level. Switch 180 when closed inhibits the printing or coating and all the drops are caught.

What is claimed is:

1. Jet drop coating apparatus comprising an orifice plate having a series of jet forming orifices arranged along a line, a manifold communicating with said orifices, fluid supply means for providing a supply of coating liquid under stream-forming pressure to said manifold to cause a series of jets of coating liquid to flow out from said orifices, a stimulation generator for generating a stimulation signal, a stimulation transducer connected for driving by said stimulation generator and arranged for stimulating each of said jets to break up in drops at the operating frequency of said stimulation generator, a common charging electrode positioned along side said streams at the position of drop generation for inducing common electrical charges in drops being generated by all said streams, a source of charging potential connected to said charging electrode, switch means between said charging potential source and said charging electrode for interrupting the application of charge to said charging electrode, a common deflection electrode for deflecting those of said drops which are charged by said charging electrode and thereby establishing drop trajactories which are characterized by either deflected or nondeflected flight paths, a common catcher for catching all drops having one of said trajactory characterizations, transport means for transporting a drop receiving substrate through a coating region for coating by those of said drops which are not caught by said catcher, tachometer means for monitoring the movement of said substrate and generating a tachometer signal in synchronism therewith, and a coverage control unit responsive to said tachometer signal and to said stimulation generator for controlling the operation of said switch thereby causing intermittent catching of said drops and controlling the density of coating of said substrate.

2. A drop control system for jet drop coating apparatus, the said apparatus having a substantially sine wave stimulation signal of a predetermined frequency, a drop charging electrode, a deflection electrode, a coating region, means for moving a substrate material to be coated through the coating region, a jet of fluid for coating, a signal controllable charge driver providing an electrical charging potential that when applied to the said charging electrode charges a drop emerging the said jet whereby a deflection of the drop occurs as it passes the deflection electrode and the drop is inhibited from coating the said substrate, the said drop control system providing for manual selection of density of coating deposited on the said substrate substantially independent of the velocity of movement of the substrate material being coated, the said drop control system comprising:

means cooperating with the said moving substrate material providing a signal responsive to the movement of the said substrate material over a predetermined unit element of distance;

means cooperating with the said sine wave stimulation signal providing a square wave signal of the same frequency; and control means including a counter, the counter providing a manually selectable unitary number of counts, cooperating with the signal responsive to the substrate movement and with the said square wave signal for switching off the said driver during the manually selected number of counts of cycles of the said square wave, during a portion of each element of distance movement of said substrate and switching on the said charge driver during the remainder of each said element of distance movement.

3. The control system as claimed in claim 2 wherein the counter of said control unit is activated to commence counting by the said signal responsive to the movement of the substrate over the said predetermined element of distance and the count of cycles of square waves occurs at a predetermined position on the cycle of said square wave.

4. The control system as claimed in claim 3 wherein the said signal responsive to predetermined element of distance of substrate movement is a train of voltage pulses with each pulse of the pulse train indicative that the said substrate has moved the said predetermined distance between corresponding voltage positions on successive pulses in the train of pulses.

5. A drop control system for jet drop coating apparatus, the said apparatus having a cyclic stimulation signal, a drop charging electrode, a coating region, means for moving a substrate material to be coated through the coating region, and means cooperating with the drop charging electrode providing for coating the substrate or inhibiting coating of the substrate, the said control system comprising:

means cooperating with the said moving substrate providing a signal responsive to the movement of said substrate material over a predetermined distance;

means cooperating with the said cyclic stimulation signal for providing a signal responsive to a manually selected predetermined number of cycles of the said cyclic stimulation signal; and means responsive to the said signal responsive to the substrate movement and the said signal responsive to the selected number of cycles, cooperating with the said drop charging electrode, whereby the said coating apparatus coats the said substrate during the said selected number of cycles over a portion of the substrate movement of the predetermined distance and inhibits the coating of the substrate during the remainder of the predetermined distance.

* * * * *